United States Patent [19]

Revercomb

[11] 4,022,362
[45] May 10, 1977

[54] BICYCLE CARRIER

[76] Inventor: Jess G. Revercomb, 6890 Old Porter Road, Portage, Ind. 46368

[22] Filed: Dec. 18, 1975

[21] Appl. No.: 642,011

[52] U.S. Cl. .............................. 224/42.1 F; 211/22
[51] Int. Cl.² ........................................ B60R 9/10
[58] Field of Search ............... 224/42.1 R, 42.1 B, 224/42.1 D, 42.1 E, 42.1 F, 42.1 G, 42.03 R, 42.03 B, 42.39, 29 R, 42.1 C; 280/179 A, 11.37 A, 11.37 K; 211/17, 22, 60 SK, 18, 60 R, 64; 24/68 CD, 265 CD

[56] References Cited

UNITED STATES PATENTS

| 1,002,901 | 9/1911 | Christman | 24/68 CD X |
| 1,853,261 | 4/1932 | Dawson | 224/42.1 C X |
| 2,782,973 | 2/1957 | Lang | 224/42.1 F |
| 3,137,422 | 6/1964 | Wheaton | 224/42.1 R |
| 3,260,429 | 7/1966 | Yuda et al. | 224/42.1 R |
| 3,833,160 | 9/1974 | Andersson | 224/42.1 F |
| 3,848,784 | 11/1974 | Shimano et al. | 224/42.1 F |
| 3,887,966 | 6/1975 | Gley | 24/68 CD |
| 3,931,919 | 1/1976 | Gerber et al. | 224/29 R X |

FOREIGN PATENTS OR APPLICATIONS

| 1,117,290 | 2/1956 | France | 224/42.1 B |
| 1,211,249 | 10/1959 | France | 224/42.1 B |

Primary Examiner—Robert J. Spar
Assistant Examiner—Winston H. Douglas
Attorney, Agent, or Firm—Walter Leuca

[57] ABSTRACT

A rack for mounting on the roof of a vehicle for carrying bicycles. The rack retains the bicycles position by using a plurality of straps which are adjustably secured to the rack supports.

6 Claims, 5 Drawing Figures

Fig. 3
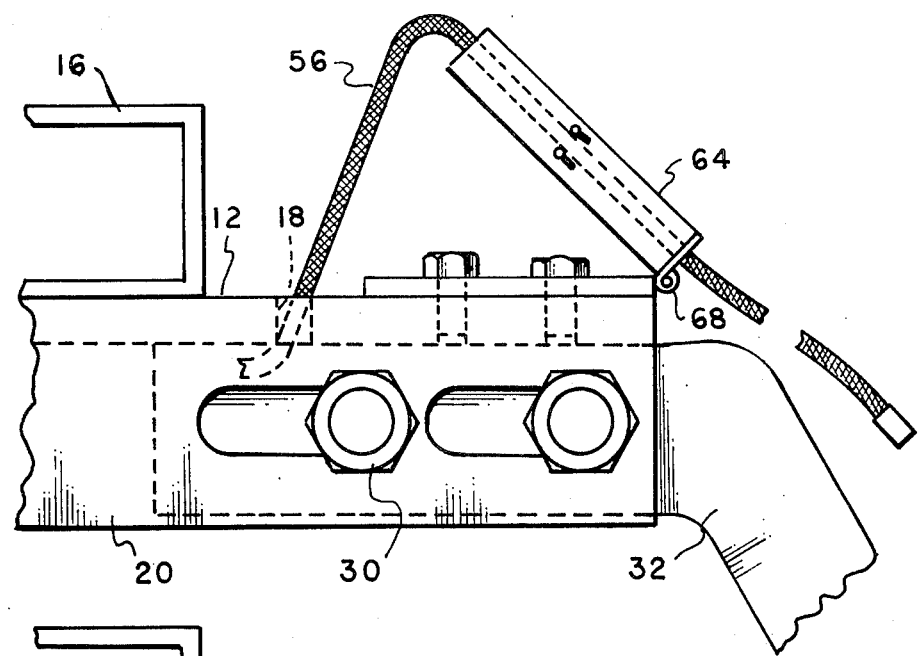
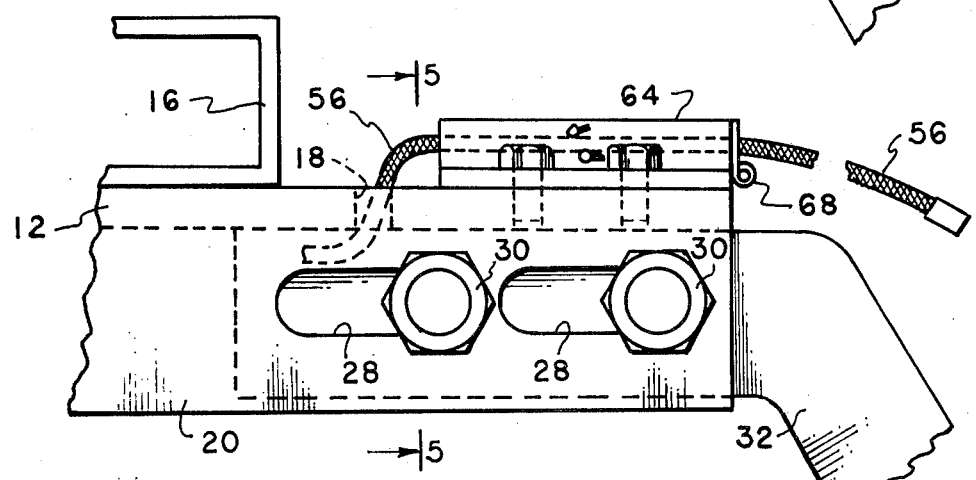
Fig. 4
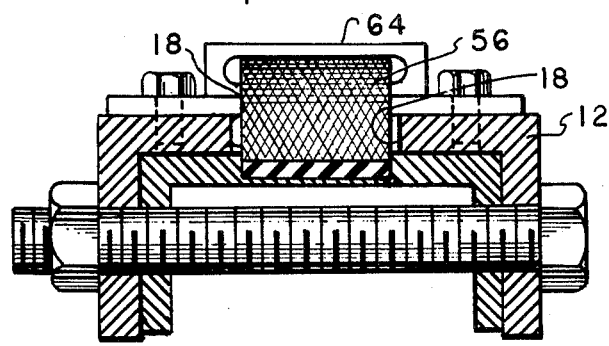
Fig. 5

BICYCLE CARRIER

BACKGROUND OF THE INVENTION

1. Field of the Invention

This invention relates generally to bicycle carriers and more particularly to a bicycle carrier for a vehicle 2. Description of the Prior Art The bicycle carriers of the prior art that I am aware of which are adapted to be mounted on vehicles are complicated and expensive to manufacture and are structured to require the bicycle carried to be partially dismantled.

SUMMARY OF THE INVENTION

I provide a bicycle carrier mountable on a vehicle which is simple and economical to manufacture in that the front and back support member are identical in structure and are provided with means which effectively secure the bicycles thereon without the need to disassemble the bicycles. I accomplish these objectives by providing a pair of elongated support members laterally extending across the vehicle top. The support members are formed with a plurality of upstanding ribs spaced along the length thereof. The support members are also provided with slots straddling each of said ribs. The ribs are spaced apart to receive therebetween the seat of the bicycle when the bicycle is inverted thereon and thereby restrained therebetween against lateral shifting. The space between the upstanding ribs on the other support member will receive the handle bars of the inverted bicycle with equal facility. I provide a belt or strap secured at one of the ends of each support member and is woven through the slots straddling the upstanding ribs, passing through the slots on each side of the seat and handle bars and thereover to secure the bicycle seat and handle bars to the support members. The end of the belts are connected to a buckle member hingedly connected to the other end of each support member. Connected to each end of the support members are bracket devices which are formed to connect to the edges of the vehicle top by which means the support members of the bicycle carrier of my invention are securely mounted. The support members of my invention are further supported in adjustable spaced-apart relation by telescoping braces.

Other objects and advantages of my invention will become more apparent after a careful study of the following detailed description taken together with the accompanying drawings which illustrate a preferred embodiment of my invention.

BRIEF DESCRIPTION OF THE DRAWINGS

FIG. 3 is a detail drawing of the side view of a fragment of the invention showing the hinged belt buckle in the raised position;

FIG. 4 is a detail drawing of the side view of a fragment of my invention showing the hinged belt buckle in the reclined position; and FIG. 5 is a cross section end view taken along lines 5—5 of FIG. 4.

DESCRIPTION OF THE PREFERRED EMBODIMENT

Figure 1:
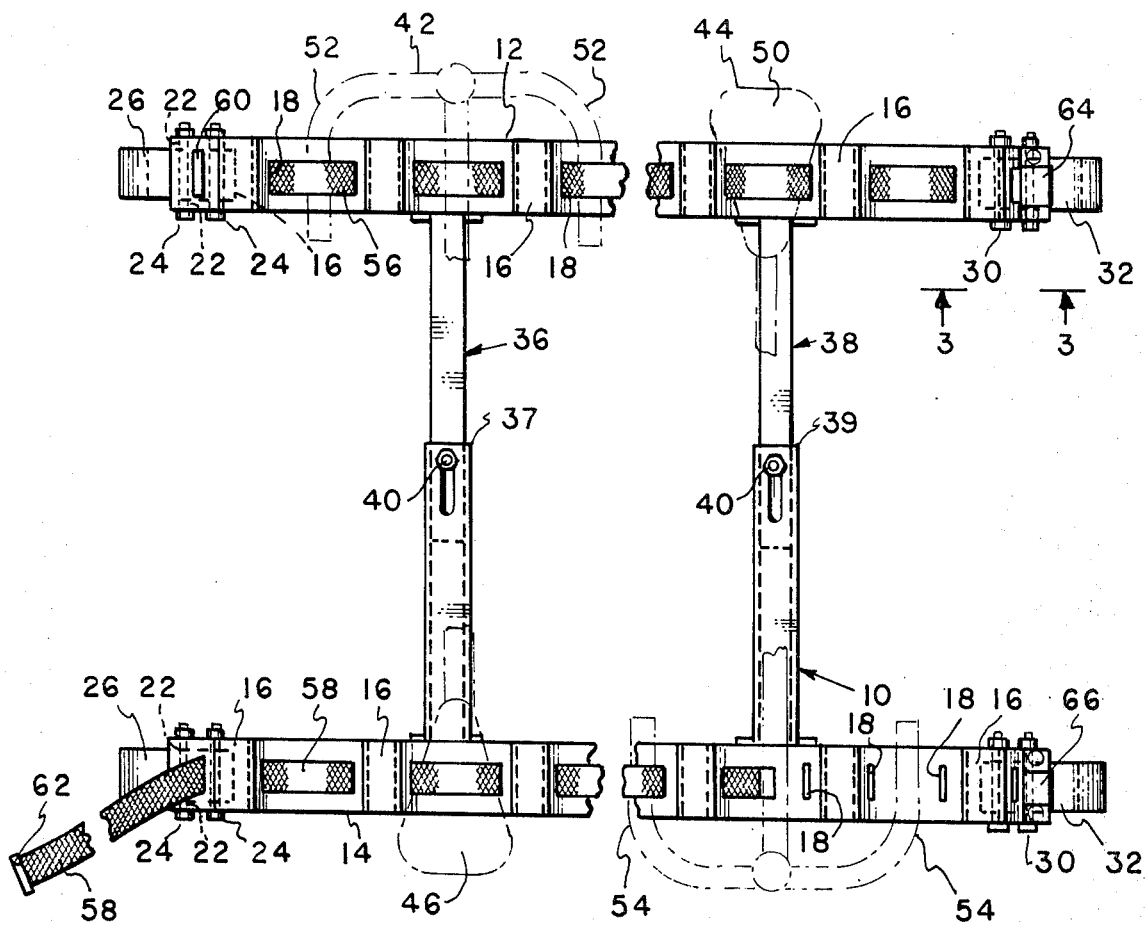
FIG. 1 is a top view of the bicycle carrier of my invention longitudinally broken at the center, and showing in phantom lines fragment of bicycles mounted thereon.
Figure 2:
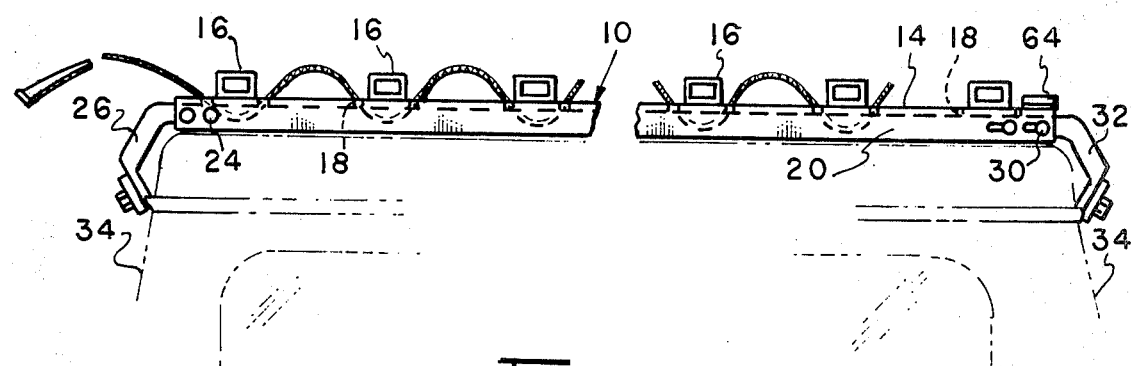
FIG. 2 is the back side view of my invention broken at the center and shown anchored to the rain drip trough of a vehicle top which is shown in phantom lines.

Referring now to the drawings, the reference numeral 10 designates generally the bicycle carrier of my invention. It comprises, in plan, a rectangular frame having fore and aft laterally extending bicycle support members 12 and 14 preferably formed from channel bars. Each member 12 and 14 is provided with a plurality of upstanding ribs 16 which are regularly spaced the length of each of said support members 12 and 14. Slots 18 are provided in support members 12 and 14 between upstanding ribs 16. The depending sides 20 of channel support members 12 and 14 are provided at one end thereof with aligned holes 22 for receiving therethrough bolts 24 by which means support brackets 26 are connected to support members 12 and 14. Depending sides 20 at the other end of the channel support members 12 and 14, as more clearly shown in FIG. 4, contain slotted openings 28 for receiving therethrough bolts 30 by which means another support bracket 32 is connected. The slotted openings 28 at the other end of support members 12 and 14 allow for longitudinal movement so that support bracket members 32 may be adjusted to connect to the sides of vehicle top 34 on which the bicycle carrier 10 of my invention is mounted. I also provide longitudinally extending, laterally spaced braces 36 and 38 connected at their distal ends to bicycle support members 12 and 14 by any convenient means such as screws or by weldments. Braces 36 and 38 are divided as at 37 and 39 respectively, for telescopic adjustment and suitably connected together by screw connecting means 40 through a slot-hole alignment, so that fore and aft bicycle support members 12 and 14 may be fixed in spaced apart position to accommodate the bicycles to be carried.

Bicycles to be transported, designated generally by numeral 42 and 44 are mounted on bicycle carrier 10 of my invention in an inverted position as illustrated in FIG. 1. The fore and aft bicycle support members 12 and 14 are longitudinally spaced apart to bridge the space between seats 46, 50 and the handle bars 52, 54 of bicycles 42, 44, respectively, to be carried. Seat 46 of bicycle 42 invertedly mounted on the bicycle carrier 10, is placed on support member 14 so that the seat is laterally and longitudinally restrained between two adjacent upstanding ribs 16 as illustrated in dotted lines of FIG. 1. The handle bars 52 of bicycle 42 are placed on support member 12 so that each handle of the handle bars rests between two upstanding ribs 16 thereof. Since the handle bar span is greater than the seat span, I invertedly mount a second bicycle 44 so that the seat 50 thereof rests between two adjacent upstanding ribs 16 on support member 12 adjacent the bicycle handle 52 of the previously mounted bicycle 42, and the handle bars 54 of bicycle 44 rest on support member 14 adjacent the seat 46 of previously mounted bicycle 42. This alternate arrangement of bicycles 42 and 44 allows for compact assembly and a greater number of bicycles to be mounted on the bicycle carrier 10 of my invention.

After mounting the bicycles in an inverted position on the bicycle carrier 10 of my invention as above described, I then secure the bicycles at the seat members and the handle bar members thereof, by weaving belts 56 and 58 through slots 18 in support members 12 and 14 respectively. Belts 56 and 58 are anchored at one end of support members 12 and 14 by providing bars 60 and 62 connected to the ends of belts 56 and 58 respectively. Bars 60 and 62 are dimensioned to exceed the passageway of end slot 18 to straddle the seat and handle bar members on each support members 12 and 14. The free ends of belts 56 and 58 are passed through buckle members 64 and 66 respectively, anchored to the other end of the support members 12 and 14. Buckle members 64 and 66 are hingedly anchored as at 68 as more clearly shown in FIGS. 3 and 4, so they may be tipped away from the slot 18 adjacent thereto to facilitate entry therein of the free ends of belts 56 and 58. Belts 56 and 58 are drawn tightly through buckle members 64 and 66 respectively and locked to secure inverted bicycles 42 and 44 on support members 12 and 14. Belts 56 and 58 are locked in position in buckle members 64 and 66 after tightening, by any convenient method known to the prior art such as friction binding as illustrated in FIG. 4.

I claim:
1. A bicycle carrier for a vehicle top comprising:
 a first and second support member;
 a brace member connecting said first and second support members;
 brackets provided at the ends of said first and second support members, said brackets having means for connection to said vehicle top;
 a plurality of upstanding ribs provided on each of said first and second support members regularly spaced the lengths thereof;
 said ribs on said first and second support members are laterally spaced to receive therebetween an inverted seat of a bicycle;
 each of said first and second support members having a plurality of slotted openings therein between said ribs on said support members;
 a buckle provided on each of said first and second support members at one end thereof; and
 a belt anchored at an end of each of said first and second support members, the other end of said belt being insertable through said slots in said support members and through said buckle for tightening therethrough.

2. The bicycle carrier of claim 1 wherein said brace member connecting said first and second support members are further characterized as being longitudinally extendable for adjustably spacing said first and second support members.

3. The bicycle carrier of claim 2 wherein said brace member is further characterized as having means to fix said brace member in an adjusted position.

4. The bicycle carrier of claim 1 wherein one of said brackets provided on each of said first and second support members being adjustably connected to said first and second support members.

5. The bicycle carrier of claim 1 wherein said buckle on each of said first and second support member is further characterized as being hingedly connected thereto.

6. A bicycle carrier for a vehicle top comprising:
 a first and second support member;
 a longitudinally extendable brace member connecting said first and second support members;
 means on said brace member fixedly connecting said longitudinally extendable brace member;
 A bracket member connected to an end of said first and second support members, said bracket members having means for connection to said vehicle top;
 a bracket member adjustably connected to the other end of said first and second support members, said bracket member having means for connection to said vehicle top;
 a plurality of upstanding ribs provided on said first support member regularly spaced the length thereof;
 a second plurality of upstanding ribs provided on said second support member regularly spaced the length thereof;
 said ribs on said first and second support members are laterally spaced to receive therebetween an inverted seat of a bicycle;
 said first support member having a plurality of slotted openings therein between said ribs on said support member;
 said second support member having a plurality of slotted openings therein between said ribs on said support member;
 a buckle member hingedly connected to said first support member at one of said ends thereof;
 a second buckle member hingedly connected to said second support member at one of said ends thereof;
 a belt anchored at the other of said ends of said first support member, the other end of said belt being insertable through any of said slots in said support member and through said hingedly connected buckle member for tightening therethrough; and
 a second belt anchored at the other of said ends of said second support member, the other end of said belt being insertable through any of said slots in said support member and through said hingedly connected buckle member for tightening therethrough.

* * * * *